United States Patent
Kim

(10) Patent No.: US 8,758,073 B2
(45) Date of Patent: Jun. 24, 2014

(54) ADHESIVE, DISPLAY APPARATUS HAVING THE ADHESIVE, METHOD OF MANUFACTURING THE DISPLAY APPARATUS, AND BONDING APPARATUS USING THE ADHESIVE

(75) Inventor: Dong-Won Kim, Chungcheongnam (KR)

(73) Assignee: Samsung Display Co., Ltd. (KR)

(*) Notice: Subject to any disclaimer, the term of this patent is extended or adjusted under 35 U.S.C. 154(b) by 374 days.

(21) Appl. No.: 13/011,758

(22) Filed: Jan. 21, 2011

(65) Prior Publication Data

US 2011/0187686 A1    Aug. 4, 2011

(30) Foreign Application Priority Data

Feb. 4, 2010   (KR) .................. 10-2010-0010524

(51) Int. Cl.
*H05B 33/10*   (2006.01)

(52) U.S. Cl.
USPC ............................................. 445/25; 445/24

(58) Field of Classification Search
CPC ............... C08F 2/00; C08F 2/50; C09J 5/00; G06F 3/038; B27G 11/02; H01L 27/1214; H01L 33/00; H05B 33/10
USPC ....................................................... 445/24, 25
See application file for complete search history.

(56) References Cited

U.S. PATENT DOCUMENTS

| | | | | |
|---|---|---|---|---|
| 5,194,934 | A | * | 3/1993 | Yamazaki et al. ............. 257/782 |
| 6,136,506 | A | * | 10/2000 | Hashimoto et al. ......... 430/280.1 |
| 2007/0004110 | A1 | * | 1/2007 | Tanaka .......................... 438/166 |
| 2007/0085112 | A1 | * | 4/2007 | Yamazaki et al. ............. 257/288 |
| 2008/0188157 | A1 | * | 8/2008 | Tashiro et al. .................. 445/25 |
| 2011/0244695 | A1 | * | 10/2011 | Gvishi .......................... 438/780 |

* cited by examiner

*Primary Examiner* — Anh Mai
*Assistant Examiner* — Andrew Coughlin
(74) *Attorney, Agent, or Firm* — Innovation Counsel LLP

(57) ABSTRACT

An adhesive includes a base resin and a mixture. The base resin maintains a shape of the adhesive. The mixture is mixed in the base resin and a monomer reacts with the base resin and an ultraviolet (UV) initiator to initiate a polymerization reaction of the monomer as it is irradiated with UV light. The output pad electrode of the driving part and the input pad electrode of the display panel are electrically and physically connected to each other by using the adhesive cured as the UV light is irradiated, thereby simplifying a manufacturing process of a display apparatus and preventing a short that may be generated between pad electrodes.

6 Claims, 7 Drawing Sheets

ADHESIVE, DISPLAY APPARATUS HAVING THE ADHESIVE, METHOD OF MANUFACTURING THE DISPLAY APPARATUS, AND BONDING APPARATUS USING THE ADHESIVE

PRIORITY STATEMENT

This application claims priority under 35 U.S.C. §119 to Korean Patent Application No. 2010-0010524, filed on Feb. 4, 2010 in the Korean Intellectual Property Office (KIPO), the contents of which are herein incorporated by reference in their entirety.

BACKGROUND

1. Field of the Invention

The present invention relates to an adhesive, a display apparatus having the adhesive, a method of manufacturing the display apparatus, and a bonding apparatus using the adhesive. More particularly, an adhesive suitable for an out lead bonding (OLB), a display apparatus having the adhesive, a method of manufacturing the display apparatus and a bonding apparatus using the adhesive are disclosed.

2. Description of the Related Art

A display apparatus includes a display panel having an array substrate and an opposite substrate. The display apparatus also includes a backlight assembly having a light source that provides the display panel with light. The display apparatus is divided into a display area that displays an image and a peripheral area surrounding the display area.

The peripheral area contains a gate driving part that provides gate lines with gate signals and a data driving part provides data lines with data signals. The gate driving part and the data driving part may be mounted in the peripheral area using a chip on glass (COG) mounting method or a tape carrier package (TCP) mounting method.

Output pad electrodes (hereinafter, output terminals) of the gate driving part and the data driving part are electrically connected to input pad electrodes (hereinafter, input terminals) located in the peripheral area to provide the input pad electrodes with the gate signals and the data signals. For example, the output terminals are attached to the display apparatus and electrically connected to the input terminals located in the peripheral area by an adhesive such as an anisotropic conductive film (ACF), a thermoset non-conductive paste (NCP), etc.

To achieve a minimization or a maximization of the display apparatus and a high quality image for the display apparatus, the width and the pitch of the output terminals of the gate driving part and the data driving part need to be precise. Thus, when ACF is used as the adhesive, instead of placing the conductive balls of the ACF between the output terminals or between the output terminal and a first input terminal corresponding to the output terminal, the conductive balls of the ACF are disposed between the output terminal and a second input terminal adjacent to the first input terminal, as a result a short may occur.

In addition, when the ACF or the thermoset NCP adhesives are cured by heat, the process for electrically and physically connecting the output terminal with the input terminal is complicated. For example, the process may include a provisional compression process at a first temperature, a main compression process at a second temperature higher than the first temperature, etc.

In addition, because the ACF or the thermoset NCP has a high thermal expansion coefficient, and thus a size variation value due to the heat is very large, it is difficult for the ACF or the thermoset NCP adhesives to continuously and electrically connect the output terminal with the input terminal

SUMMARY

In one aspect an adhesive suitable for an out lead bonding (OLB) having a precise pitch is provided.

A display apparatus having the above-mentioned adhesive is also provided, as well as a method of manufacturing the display apparatus.

In another aspect a bonding apparatus for the adhesive is provided.

According to one aspect of the present invention, an adhesive includes a base resin and a mixture. The base resin maintains a shape of the adhesive. The mixture is mixed in the base resin, and has a monomer that reacts with at least the base resin and an ultraviolet (UV) initiator that initiates the reaction of the base resin upon irradiation with the UV light.

The UV initiator may absorb light having a wavelength in a range between about 200 nm and about 500 nm.

Removing the supply of air from an area surrounding the adhesive may cause the monomer and resin to further react.

The base resin may include a urethane acrylate oligomer or an epoxy oligomer.

The monomer may include a urethane acrylate monomer or an epoxy monomer.

The mixture further may include a visible light initiator for initiating the reaction of the monomer as the adhesive is irradiated with visible light.

According to another aspect, a display apparatus includes a display panel, a driving part and an adhesive. The display panel has a display area and a peripheral area. A gate line, a data line, a switching element and a pixel electrode are formed in the display area. The peripheral area surrounds the display area. An input pad electrode is extended from the gate and data lines, and is formed in the peripheral area. The driving part includes an output pad electrode corresponding to the input pad electrode and is disposed in the peripheral area. The adhesive includes a base resin maintaining a shape of the adhesive and a mixture mixed in the base resin to electrically and physically connect the input pad electrode with the output pad electrode. The mixture has a monomer that reacts with the base resin and an ultraviolet (UV) initiator that initiates the reaction of the monomer with the base resin upon irradiation with the UV light.

The mixture may be additionally caused to react by removing air from an area surrounding the adhesive.

The peripheral area includes a first area in which the input pad electrode and the output pad electrode overlap and a second area in which the input pad electrode and the output pad electrode do not overlap. The adhesive may be partially disposed in the first area and partially disposed in the second area. The adhesive disposed in the first area may be cured by irradiation with UV light, and the adhesive disposed in the second area may be cured by removing air from an area surrounding the adhesive in the second area.

The mixture may further include a visible light initiator for initiating the reaction of the monomer as the adhesive is irradiated with visible light.

The base resin may include a urethane acrylate oligomer or an epoxy oligomer.

According to still another aspect, there is provided a method of manufacturing a display apparatus. In the method, a gate line, a data line, a switching element and a pixel electrode are formed in a display area. Input pad electrodes extended from the gate line and the data line are formed in a peripheral area surrounding the display area to form a display panel. An adhesive includes a base resin maintaining a shape of the adhesive and a mixture mixed in the base resin. The mixture includes a monomer that reacts with at least the base resin and the ultraviolet (UV) initiator that initiates the reaction of the monomer with the base resin up on irradiation with the UV light. A driving part including an output pad electrode corresponding to the input pad electrode is disposed on the display panel on which the adhesive is disposed. The UV light is irradiated to a rear surface of the display apparatus on which the output pad electrode is disposed to cure the adhesive.

The peripheral area includes a first area in which the input pad electrode and the output pad electrode overlap and a second area in which the input pad electrode and the output pad electrode do not overlap. The adhesive may be partially disposed in a first area and partially disposed in a second area. The adhesive disposed in the first area may be cured by irradiation with UV light.

The adhesive disposed in the second area may be cured by removing air from an area surround the adhesive on the second area.

The mixture may further include a visible light initiator for initiation the reaction of the monomer as the adhesive is irradiated with visible light.

In the method, an upper surface of the display apparatus on which the output pad electrode is disposed may be irradiated with visible light.

The output pad electrode may be aligned to the input pad electrode by pressing the driving part.

According to still another aspect, a bonding apparatus includes a panel stage, a dispenser, an aligner, a UV light source and a bonding tool. A display panel that is divided into a display area and a peripheral area is mounted on the panel stage. The dispenser provides an adhesive including a base resin and a mixture. The base resin maintains a shape of the adhesive. The mixture is mixed with the base resin and is cured by irradiation with UV light. The aligner aligns a driving part that includes an output pad electrode corresponding to the input pad electrode on a spread adhesive. The UV light source provides the UV light on a rear surface of a display apparatus corresponding to the driving part aligned by the aligner. The bonding tool presses the driving part aligned by the aligner toward the display apparatus.

The UV light may have a wavelength range between about 200 nm and about 500 nm.

The bonding apparatus may further include a laser light source generating heat to bond the adhesive to the driving part.

According to one aspect, the output pad electrode of the driving part and the input pad electrode of the display panel are electrically and physically connected to each other using the adhesive cured under a first condition in which the adhesive is irradiated UV light, so the provisional compression process is not needed. Thus, manufacturing processes may be simplified and a short between precise pad electrodes may be prevented.

BRIEF DESCRIPTION OF THE DRAWINGS

The above and other features and advantages will become more apparent by describing in detail example embodiments thereof with reference to the accompanying drawings, in which.

DETAILED DESCRIPTION

Figure 1:
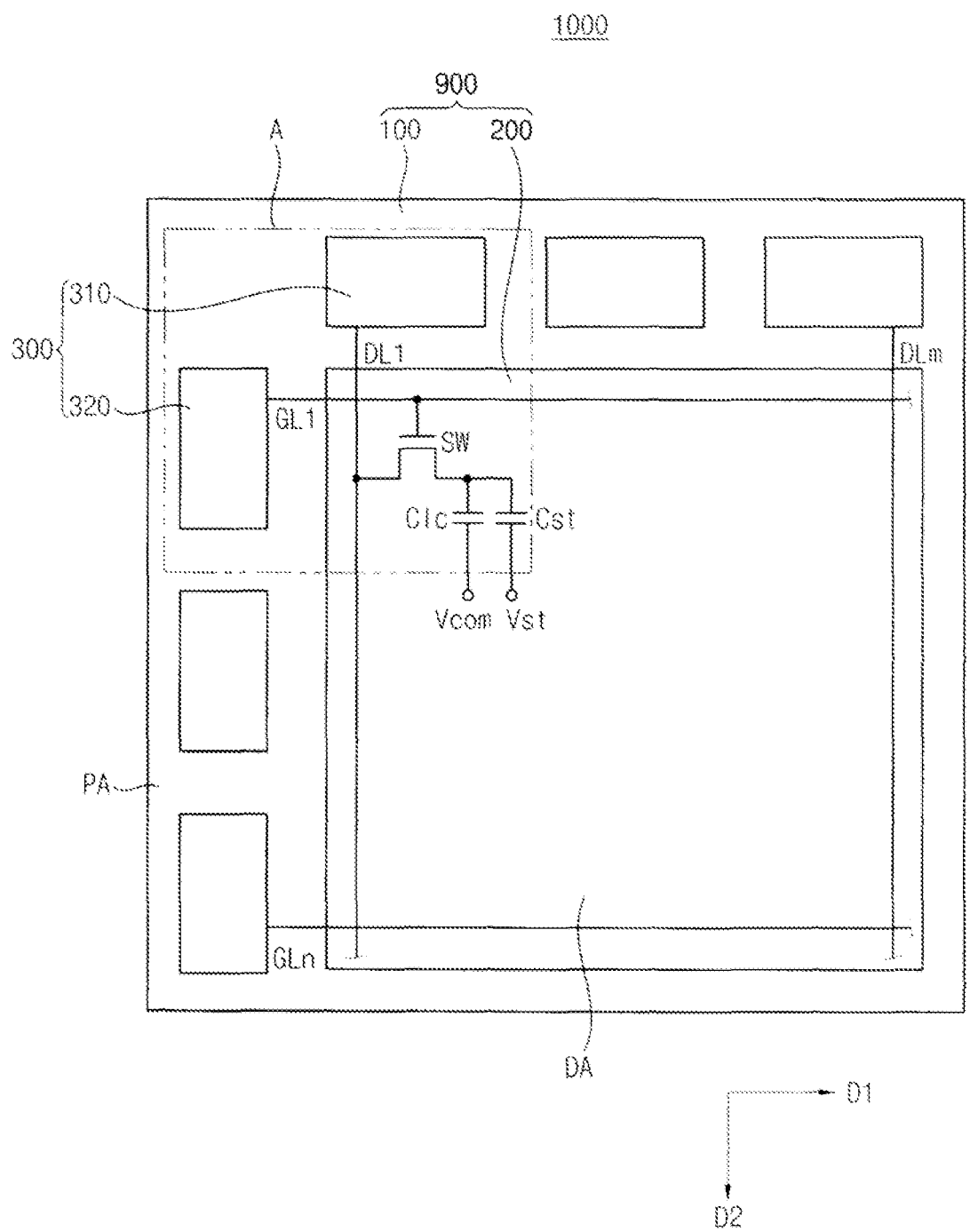
FIG. 1 is a plan view illustrating a display apparatus according to an example embodiment.

The present invention is described more fully hereinafter with reference to the accompanying drawings, in which example embodiments are shown. The present invention may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the apparatus in use or operation in addition to the orientation depicted in the figures. For example, if the apparatus in the figures is turned over, elements described as "below" or "beneath" other elements or features would then be oriented "above" the other elements or features. Thus, the exemplary term "below" can encompass both an orientation of above and below, depending on the orientation. The apparatus may be otherwise oriented (rotated 90 degrees or at other orientations) and the spatially relative descriptors used herein interpreted accordingly.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of an apparatus and are not intended to be limiting.

Unless otherwise defined, all terms (including technical and scientific terms) used herein have the same meaning as commonly understood by one of ordinary skill in the relevant art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments will be explained in detail with reference to the accompanying drawings.

FIG. 1 is a plan view illustrating a display apparatus according to an example embodiment.

Referring to FIG. 1, the display apparatus 1000 according to the present example embodiment includes a display panel 900 and a driving part 300. The display panel 900 includes an array substrate 100, an opposite substrate 200 and a liquid crystal layer (not shown). The display panel 900 has a display area DA and a peripheral area PA. In the display area DA, the array substrate 100 and the opposite substrate 200 overlap with each other. In the peripheral area PA, the array substrate 100 and the opposite substrate 200 do not overlap with each other.

The array substrate 100 may include a gate line GL, a data line DL, a switching element SW, a pixel electrode (not shown) and a storage electrode (not shown).

The opposite substrate 200 may include a color filter layer (not shown) and a common electrode (not shown). The opposite substrate 200 faces the array substrate 100.

The driving part 300 includes a gate driving circuit 310 and a data driving circuit 320. The driving part 300 is disposed in the peripheral area PA and provides the gate line GL and the data line DL with, respectively, a gate signal and a data signal. The gate and data signals typically originate from outside of the peripheral area PA and are provided from, for example, a printed circuit board (PCB).

Figure 3:
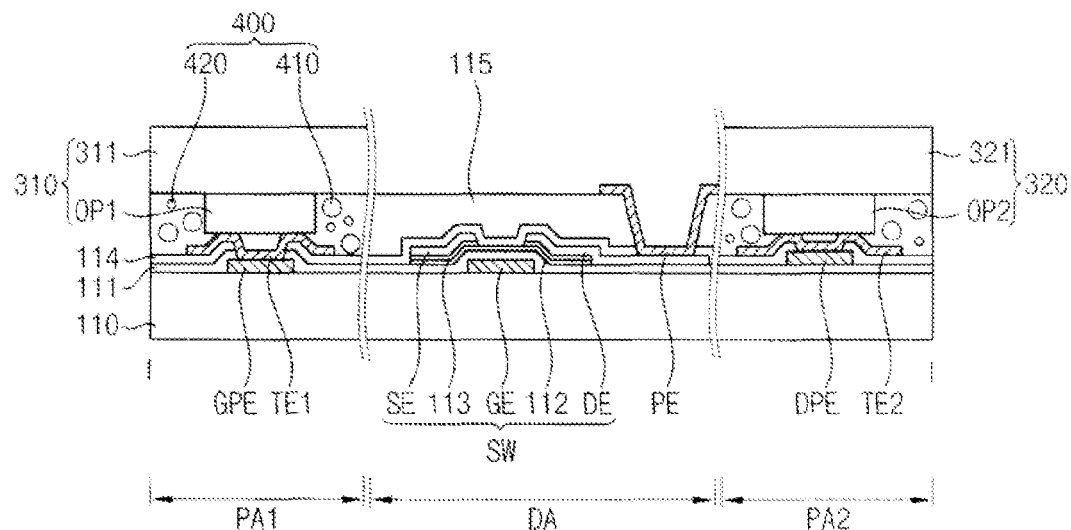
FIG. 3 is a cross-sectional view taken along I-I' line of FIG. 2.

The driving part 300 is adhered to the peripheral area PA of the display panel 900 by an adhesive (reference number 400 in FIG. 3).

The liquid crystal layer is interposed between the array substrate 100 and the opposite substrate 200. The liquid crystal layer may form a liquid crystal capacitor Clc with the pixel electrode and the common electrode. In addition, the storage electrode may form a storage capacitor Cst with the pixel electrode or the common electrode.

Figure 2:
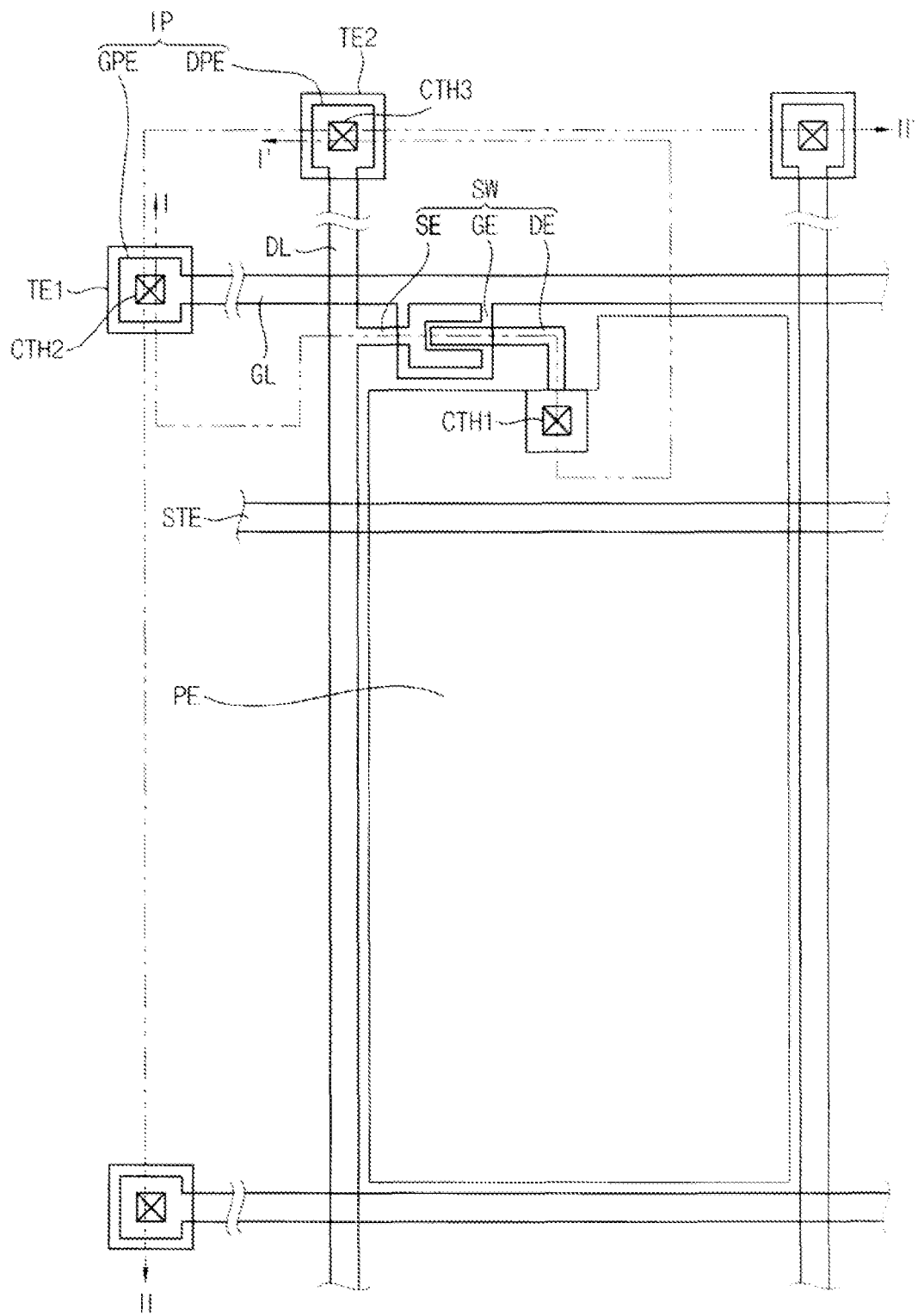
FIG. 2 is a detail plan view illustrating a portion 'A' of an array substrate of FIG. 1.

FIG. 2 is a detailed plan view illustrating a portion of an array substrate of FIG. 1.

Referring to FIGS. 1 and 2, the array substrate 100 includes a gate line GL, a data line DL, an input pad electrode IP, a switching element SW, a pixel electrode PE, a storage electrode STE, a first transparent electrode TE1 and a second transparent electrode TE2.

The gate line GL is extended in a first direction D1. The data line DL is extended in a second direction D2 that crosses the first direction D1.

The input pad electrode IP includes a gate pad electrode GPE and a data pad electrode DPE. The gate line GL is extended to form the gate pad electrode GPE at an end of the gate line GL. The gate pad electrode GPE may be formed at one end or both ends of the gate line GL. The data line DL is extended to form the data pad electrode DPE at an end of the data line DL. The data pad electrode DPE may be formed at one end or both ends of the data line DL.

The switching element SW includes a gate electrode GE, a source electrode SE and a drain electrode DE. The gate electrode GE is branched off from the gate line GL. The source electrode SE is branched off from the data line DL. The drain electrode DE is connected to the pixel electrode PE through a contact hole CTH. Here, the pixel electrode PE may include indium tin oxide (ITO), etc.

Thus, when the gate signal provided from the gate driving circuit 310 is provided to the gate line GL through the gate pad electrode GPE, the switching element SW is turned on. When the switching element SW is turned on, the data signal provided from the data driving circuit 320 is provided to the data line DL through the data pad electrode DPE.

According to the present example embodiment, the storage electrode STE may be extended in the first direction D1 to be substantially parallel to the gate line GL. Alternatively, the storage electrode STE may be extended in the second direction D2 to be substantially parallel to the data line DL.

The first transparent electrode TE1 according to the present example embodiment is formed on the gate pad electrode GPE. The first transparent electrode TE1 may be formed when the pixel electrode PE is formed. The first transparent electrode TE1 enlarges a contact area between the driving part 300 and the gate pad electrode GPE. Alternatively, the first transparent electrode TE1 may be omitted.

The second transparent electrode TE2 according to the present example embodiment is formed on the data pad electrode DPE. The second transparent electrode TE2 may be formed when the pixel electrode PE is formed. The second transparent electrode TE2 enlarges a contact area between the driving part 300 and the data pad electrode DPE. Alternatively, the second transparent TE2 may be omitted.

The first and the second transparent electrodes TE1 and TE2 may be made using the same material as the pixel electrode PE, and may include, for example, indium tin oxide (ITO).

FIG. 3 is a cross-sectional view taken along I-I' line of FIG. 2.

Referring to FIGS. 2 and 3, the display apparatus 1000 includes a base substrate 110, a gate pad electrode GPE, a first transparent electrode TE1, a data pad electrode DPE, a second transparent electrode TE2, a switching element SW, a pixel electrode PE, a first insulation layer 111, a semiconductor layer 112, an ohmic contact layer 113, a second insulation layer 114, an organic layer 115, an adhesive 400, a gate driving circuit 310 and a data driving circuit 320. The display apparatus 1000 includes a display area DA and a peripheral area PA. The peripheral area PA includes a first peripheral area PA1 and a second peripheral area PA2.

The switching element SW and the pixel electrode PE are located in the display area DA. The switching element SW includes the gate electrode GE, the source electrode SE, the drain electrode DE, the semiconductor layer 112, the ohmic contact layer 113 and the organic layer 115. The drain electrode DE is electrically connected to the pixel electrode PE through the first contact hole CTH1.

The gate pad electrode GPE, the gate driving circuit 310 and the adhesive 400 may be located in the first peripheral area PA1. The gate driving circuit 310 includes a first base film 311 and a first output pad electrode OP1. The first base film 311 may include, for example, polyimide (PI). The first output pad electrode OP1 may include, for example, one of copper (Cu), nickel (Ni) and gold (Au).

The gate pad electrode GPE is electrically connected to the first transparent electrode TE1 through a second contact hole CTH2. The first transparent electrode TE1 enlarges a contact area between the gate pad electrode GPE and the first output pad electrode OP1.

The data pad electrode DPE, the data driving circuit 320 and the adhesive 400 may be formed in the second peripheral area PA2. The data driving circuit 320 includes a second base film 321 and a second output pad electrode OP2. The second base film may include, for example, polyimide (PI). The second output pad electrode OP2 may include, for example, one of copper (Cu), nickel (Ni) and gold (Au).

The data pad electrode DPE is electrically connected to the second transparent electrode TE2 through a third contact hole CTH3. The second transparent electrode TE2 enlarges a contact area between the data pad electrode DPE and the second output pad electrode OP2.

The adhesive 400 is interposed between the gate pad electrode GPE and the gate driving circuit 310 to electrically and physically connect the gate pad electrode GPE with the gate driving circuit 310. In addition, the adhesive 400 is interposed between the data pad electrode DPE and the data driving circuit 320 to electrically and physically connect the data pad electrode DPE with the data driving circuit 320. In this case, the adhesive 400 makes contact with indium tin oxide (ITO) in first and the second transparent electrodes TE1 and TE2 and polyimide (PI) in the first base film 311 and second base film 321.

The adhesive 400 is typically cured under a first condition in which it is irradiated with UV light. For example, the adhesive 400 may be a UV non-conductive paste (NCP) or a UV non-conductive film (NCF). In addition, the adhesive 400 may be further cured under a second condition in which air supply provided to the area surrounding the adhesive is blocked. For example, when the adhesive 400 is under the first condition, the adhesive 400 in peripheral areas of the gate pad electrode GPE and the data pad electrode DPE may be first cured and then the adhesive 400 on the gate pad electrode GPE and the data pad electrode DPE may be cured. Therefore, the adhesive 400 in peripheral areas of the gate pad electrode GPE and the data pad electrode DPE is first cured, thereby stopping the air supply to the adhesive 400 on the gate pad electrode GPE and the data pad electrode DPE. In addition, the adhesive 400 may be even further cured under a third condition in which it is irradiated with visible light.

The adhesive 400 includes a base resin 410 and a mixture 420. The base resin 410 may include, for example, a urethane acrylate oligomer or an epoxy oligomer. The urethane acrylate oligomer may be hydrophobic. The base resin 410 maintains a shape of the adhesive 400 as a curing part. For example, the base resin 410 and the mixture 420 may be mixed in a weight ratio of 50:50 with respect to a total weight of the adhesive.

The mixture 420 may include a monomer and at least one initiator. For example, the monomer may be a urethane acrylate monomer or an epoxy monomer, etc. The monomers may react with the oligomer in the base resin 410 or with each other. The polymerized monomers may further react with the oligomers in the base resin 410 or the oligomer polymerized with the monomers to form the adhesive 400. For example, the adhesive 400 may be defined as a cured material which is formed by the monomers and the oligomer reacting with each other.

The initiator may include, for example, a UV-sensitive initiator that reacts upon irradiation with light in the UV wavelength range to cure the adhesive 400. For example, the UV-sensitive initiator may include a first compound that reacts on a surface of the adhesive 400 to cure the adhesive 400, and a second compound that reacts in a deeper, internal portion of the adhesive 400 to cure the adhesive 400. The UV-sensitive initiator absorbs UV light in a wavelength range between about 200 nm and about 500 nm to bond the base resin with the monomer and to cure the adhesive 400. In addition, the mixture 420 may further include a visible light-sensitive initiator that reacts upon irradiation with light in the visible wavelength range to cure the adhesive 400.

In one example, the initiator may include a radical photo-polymerization initiator or a cationic photo-polymerization initiator. The radical photo-polymerization initiator initiates a polymerization of the monomer, so that the monomer forms a polymer to be cured. The cationic photo-polymerization initiator may include, for example, diaryliodonium salt or diarylsulphonium salt. When the cationic photo-polymerization initiator absorbs UV light and attains a high energy state, the cationic photo-polymerization initiator generates the cation. The cation may initiate the polymerization of the monomer. Alternatively, the initiator may further include a radical thermal-polymerization initiator or a cationic thermal-polymerization initiator.

Because adhesive 400 is formed from base resin 410 and mixture 420 that includes monomers, various properties of the adhesive, such as, for example, viscosity, adhesiveness, flexibility and outgassing can be controlled by controlling the monomers used and the ratio between the base resin 410 and the monomer. In one example, a ratio between the base resin 410 and the monomer may be flexibly controlled to decrease the viscosity of the adhesive. For example, when the base resin 410 includes the urethane acrylate oligomer and the monomer includes the urethane acrylate oligomer, the ratio between the base resin 410 and the monomer may be controlled to improve the adhesiveness of the adhesive. Alternatively, when the base resin 410 includes the epoxy oligomer and the monomer includes the epoxy monomer, the ratio between the base resin 410 and the monomer may be controlled to improve the flexibility of the adhesive. In addition, the ratio of the monomer in the adhesive 400 may be minimized, to reduce and minimize outgassing when the adhesive is formed. Contents of the initiator may be controlled considering a speed of the curing, a depth of the curing and a minimization of a contraction.

Thus, the adhesive 400 enhances an adhesive strength and a modulus of elasticity for the indium tin oxide (ITO) and the polyimide (PI), but decreases the thermal expansion coefficient, which is indicative of the amount of expansion of at least one of the adhesive, the output pad electrode, the input pad electrode, the gate pad electrode, the data pad electrode, etc as a result of applying heat, and the humidity expansion coefficient, which is indicative of the amount of expansion of at least one of the adhesive, the output pad electrode, the input pad electrode, the gate pad electrode, the data pad electrode, etc as a result of exposure to humidity.

In the present example embodiment, the adhesive 400 is cured via irradiation with UV light without also applying heat. Alternatively, the adhesive 400 may be cured via irradiation the UV light and applying the heat at the same time, or may be cured by sequentially irradiating with UV light and applying the heat.

The method for curing adhesive 400 under the first condition and the second condition is explained below.

Figure 4:
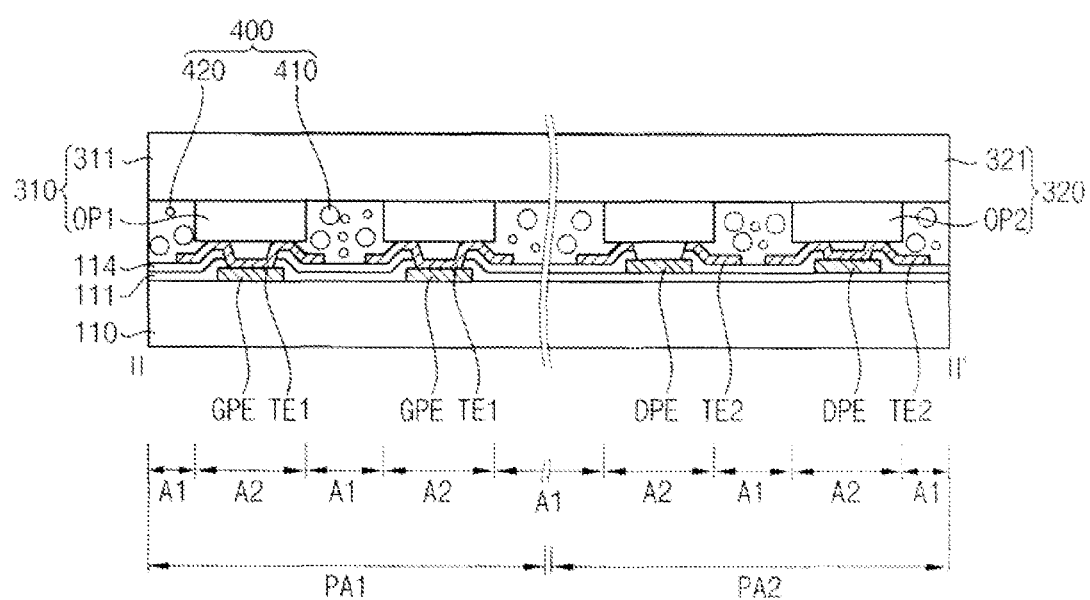
FIG. 4 is a cross-sectional view taken along II-II' line of FIG. 2.

FIG. 4 is a cross-sectional view taken along II-II' line of FIG. 2.

Referring to FIGS. 2 and 4, the adhesive 400 includes a first portion A1 and a second portion A2. The first portion A1 of the adhesive 400 is disposed in a first area where the input pad electrode IP and the output pad electrode OP do not overlap with each other. The second portion A2 of the adhesive 400 is disposed in a second area where the input pad electrode IP and the output pad electrode OP do overlap with each other. For example, the second area may be an area excluding the first area.

Because the first portion A1 is disposed in the first area, which does not have the input pad electrode IP, most of the UV light provided from the rear surface of the display panel 900 is transmitted through the first portion A1, without being blocked or reduced by the input pad electrode IP. Thus, the first portion A1 is cured by the UV light. In addition, because the second portion A2 is disposed in the second area, which does have the input pad electrode IP, the UV light provided from the rear surface of the display panel 900 is partially blocked and reduced in second portion A2. Thus, it is difficult to totally cure the adhesive by UV light in the second portion A2. Alternately, the second portion A2 may be cured as the first portion A1 is cured to block the air such as oxygen flowing into the second portion A2. For example, the adhesive 400 may be cured under a first condition in which the UV light is irradiated and may be further cured under a second condition in which the air is blocked.

However, although the adhesive 400 is cured under the first and the second conditions as discussed above, because the UV light is irradiated into the rear surface of the display panel 900, a portion of the adhesive 400 that is adjacent to the upper surface of the display panel 900 may be not totally cured.

Thus, the adhesive 400 may be further cured by irradiating the upper surface of the display panel 900 with visible light.

FIGS. 5A to 5F are cross-sectional views illustrating a method of manufacturing the display apparatus of FIG. 1.

Figure 5A:
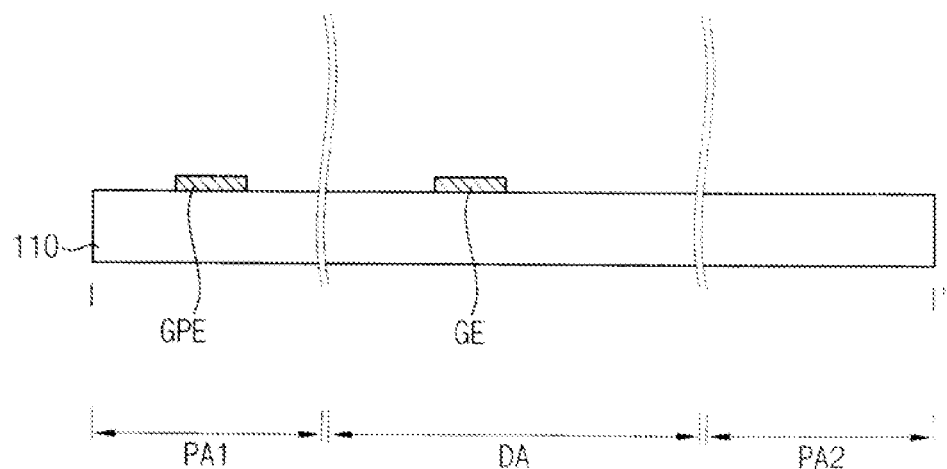
FIGS. 5A to 5F are cross-sectional views illustrating a method of manufacturing the display apparatus of FIG. 1.

Referring to FIGS. 1 and 5A, a gate metal layer is formed on the base substrate 110. The gate metal layer is patterned to form a gate pattern. Thus, a gate line GL, a gate electrode GE and a storage electrode STE are formed in the display area DA, and a gate pad electrode GPE is formed in the first peripheral area PA1.

Figure 5B:
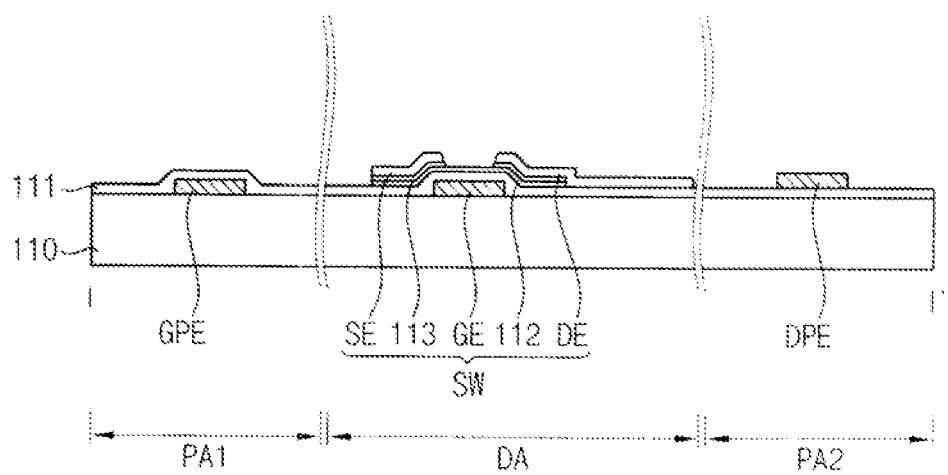

Referring to FIGS. 1 and 5B, the first insulation layer 111, the semiconductor layer 112 and the ohmic contact layer 113 are sequentially formed on the base substrate 110 having the gate pattern formed thereon. The first insulation layer 111 may include, for example, silicon nitride (SiNx) or silicon oxide (SiOx). The semiconductor 112 may include, for example, amorphous silicon. The ohmic contact layer 113 may include, for example, amorphous silicon having n+ impurities doped in a high concentration. A first photoresist layer (not shown) is formed on the base substrate 110 having the semiconductor layer 112 and the ohmic contact layer 113 formed thereon. A mask having an active pattern is disposed on the base substrate 110 on which the first photoresist layer is formed. Then, the mask is irradiated with light to form the active pattern.

A source metal layer is formed on the base substrate 110 having the active pattern formed thereon. A second photoresist layer (not shown) is formed on the base substrate 110 having the source metal layer formed thereon. A mask having a source electrode pattern, a drain electrode pattern, a data line pattern and a data pad electrode pattern is disposed on the base substrate 110 on which the second photoresist layer is formed. Then, the mask is irradiated with light to form the source electrode SE, the drain electrode DE, the data line DL and the data pad electrode DPE.

Figure 5C:
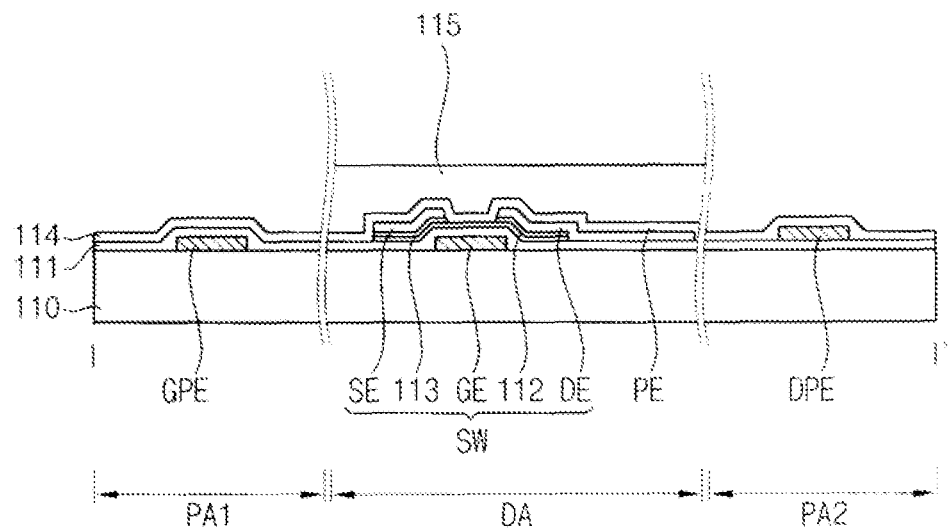

Referring to FIGS. 1 and 5C, the second insulation layer 114 and the organic layer 115 are formed on the base substrate 110 having the source electrode SE, the drain electrode DE, the data line DL and the data pad electrode DPE formed thereon. A third photoresist layer (not shown) is formed on the base substrate 110 having the organic layer 115 formed thereon. The third photoresist layer is patterned to remove the organic layer 115 from the first and the second peripheral areas PA1 and PA2.

Figure 5D:
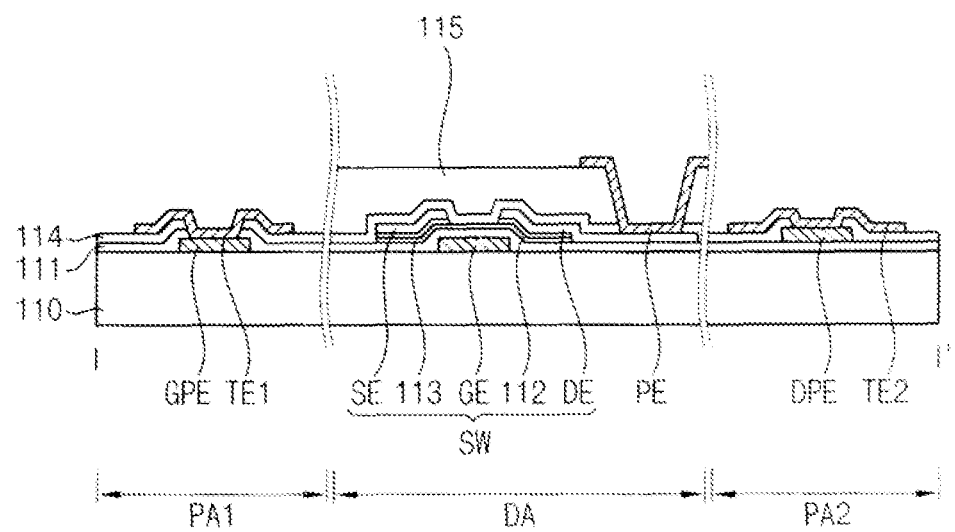

Referring to FIGS. 1 and 5D, a fourth photoresist layer (not shown) is formed on the base substrate 110 on which the organic layer 115 in the first and the second peripheral areas PA1 and PA2 is removed. The fourth photoresist layer is patterned to form the first to the third contact holes CTH1 to CTH3. Thus, the first contact hole CTH1 exposes the drain electrode DE. The second contact hole CTH2 exposes the gate pad electrode GPE. The third contact hole CTH3 exposes the data pad electrode DPE.

Then, a pixel electrode layer is formed on the base substrate 110 having the first to the third contact holes CTH1 to CTH3 formed therethrough. The pixel electrode layer may include, for example, indium tin oxide (ITO). The pixel electrode layer is patterned to form the pixel electrode PE electrically connected to the exposed drain electrode DE, the first transparent electrode TE1 electrically connected to the exposed gate pad electrode GPE and the second transparent electrode TE2 electrically connected to the exposed data pad electrode DPE.

The pixel electrode PE is formed along a perimeter surface of the first contact hole CTH1. The first transparent electrode TE1 is formed along a perimeter surface of the second contact hole CTH2 and has a cross-sectional area wider than that of the gate pad electrode GPE. The second transparent electrode TE2 is formed along a perimeter surface of the third contact hole CTH3 and has a cross-sectional area wider than that of the data pad electrode DPE. Thus, the first transparent electrode TE1 enlarges the cross-sectional area in which the first output pad electrode OP1 and the gate pad electrode GPE electrically make contact with each other, and the second transparent electrode TE2 enlarges the cross-sectional area in which the second pad electrode OP2 and the data pad electrode DPE electrically make contact with each other.

Alternatively, the first and second transparent electrodes TE1 and TE2 may be omitted.

Figure 5E:
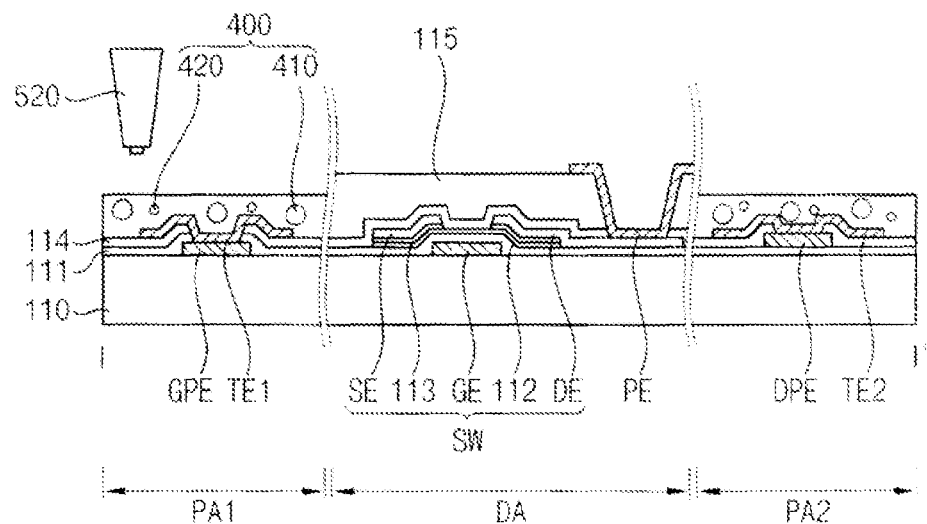

Referring to FIGS. 1 and 5E, a dispenser 520 is disposed over the first and second peripheral areas PA1 and PA2 of the base substrate 110 having the first and the second transparent electrodes TE1 and TE2 formed thereon. The dispenser is used to spread an adhesive 400 over the first and second peripheral areas PA1 and PA2. The adhesive 400 according to the present example embodiment can be uniformly spread over the first and the second peripheral areas PA1 and PA2 by the dispenser 520 and may, for example, have the consistency of a gel type paste that.

Figure 5F:
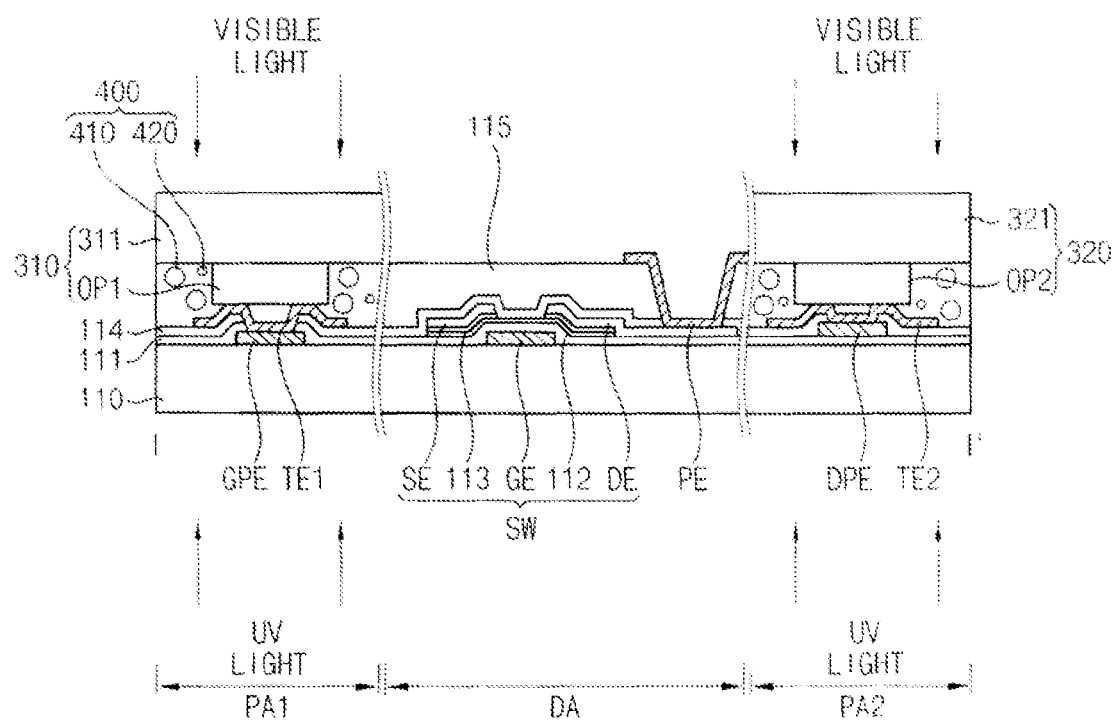

Referring to FIGS. 1 and 5F, the driving part 300, which includes gate driving circuit 310 and a data driving circuit 320, is disposed on the base substrate 110 having the adhesive 400 spread thereon.

Then, while the rear surface of the base substrate 110, which has the driving part 300 disposed on the opposite surface, is irradiated with UV light, the output pad electrodes OP1 and OP2 of the driving part 300 are aligned with the input pad electrodes GPE and DPE and the driving part 300 is pressed toward the base substrate 110. Thus, the output pad electrodes OP1 and OP2 and the input pad electrodes GPE and DPE are aligned with each other, and the adhesive 400 is cured at the same time.

For example, the first portion A1 (see FIG. 4) of the adhesive 400 is cured by the UV light and the second portion A2 of the adhesive 400 is cured by blocking the supply of air provided to the area surrounding the adhesive. The first portion A1 is disposed between the input pad electrodes IP. Because the UV light provided to the first portion A1 is not blocked by the input pad electrode IP, the first portion A1 is easily cured. However, because the UV light provided to the second portion A2 corresponding to the input pad electrode IP is blocked by the input pad electrode IP, the second portion A2 is not totally cured by the UV light. However, the adhesive 400 may be cured when the supply of air provided to the area surrounding the adhesive is blocked. Thus, as the first portion A1 is cured by the UV light, the air provided to the area surrounding the second portion A2 is also blocked. Therefore, the second portion A2 may be totally cured.

In the present example embodiment, the typical process for manufacturing the display device, which includes a pre-press process at a first temperature to align the output pad electrodes OP1 and OP2 with the input pad electrodes GPE and DPE and a main press process at a second temperature higher than the first temperature to cure the adhesive 400, may be simplified.

In addition, the upper surface of the base substrate 110 on which the driving part 300 has been formed is irradiated with visible light to totally cure the adhesive 400 disposed in an area adjacent to the driving part 300.

According to the present example embodiment, UV light is used to cure the adhesive 400 instead of heat, which can prevent a contact resistance from increasing as the output pad electrode OP and the input pad electrode IP are expanded by the heat. In addition, the adhesive 400 does not include conductive balls, to prevent a short from being generated between the output pad electrodes OP or between the output pad electrode OP and the input pad electrode IP.

Figure 6:
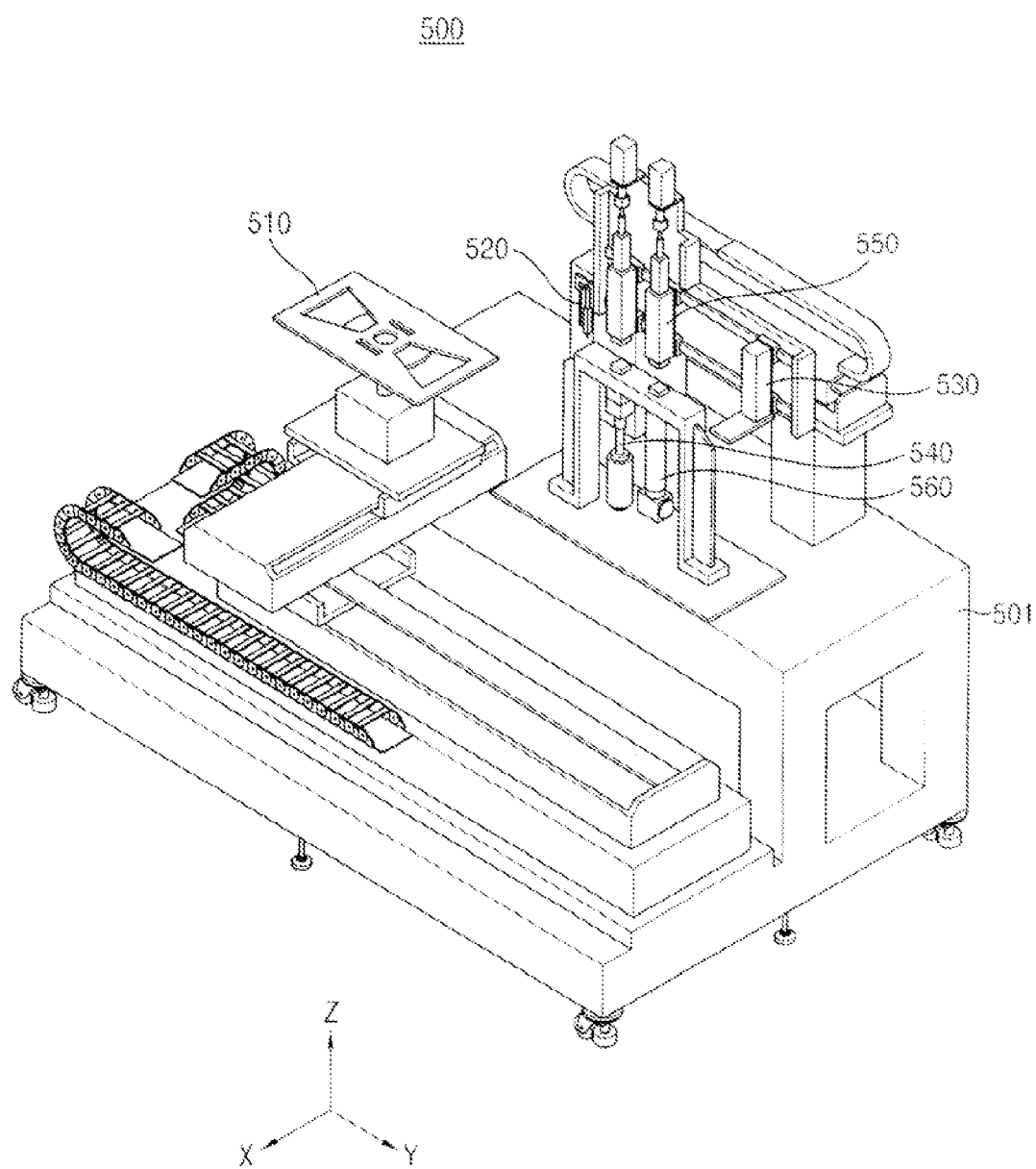
FIG. 6 is a perspective view illustrating a bonding apparatus according to another example embodiment.

FIG. 6 is a perspective view illustrating a bonding apparatus according to an example embodiment.

Because the bonding apparatus according to the present example embodiment bonds the driving part 300 on the display panel 900 according to the previous example embodiment illustrated in FIG. 1, the same reference numerals will be used to refer to the same or like parts as those described in the previous example embodiment of FIG. 1.

Referring to FIG. 6, the bonding apparatus 500 according to the present example embodiment includes a supporter 501, a panel stage 510, a dispenser 520, an aligner 530, a UV light source 540 and a bonding tool 550.

The supporter 501 provides a space on which the panel stage 510, the dispenser 520, the aligner 530, the UV light source 540 and the bonding tool 550 are mounted. The supporter 501 may have a box shape such as a cube shape, a step shape, etc., so that the panel stage 510, which is on the supporter 501, can transfer the display panel 900 into a suitable position for carrying out the processes performed by the dispenser 520, the aligner 530, the UV light source 540 and the bonding tool 550.

The panel stage 510 is mounted on a portion of a surface of the supporter 501. The display panel 900 is provided from a robot arm (not shown) and is mounted on the panel stage 510. The panel stage 510 transfers the display panel 900 along the X, Y and Z axes directions. For example, when the display panel 900 is loaded on the panel stage 510, the panel stage 510 moves the display panel 900 in the X, Y and Z axes directions to position the display panel 900 under the dispenser 520. In addition, the panel stage 510 transfers the display panel 900 in the X, Y and Z axes directions to position the display panel 900 between the light source 540 and the bonding tool 550.

The dispenser 520, the UV light source 540, the bonding tool 550 and the aligner 530 are sequentially arranged along a transferring path that panel stage 510 moves the display panel 900 so that they may perform processes on the display panel 900.

First, the dispenser 520 is positioned adjacent to the panel stage 510. The panel stage 510 aligns the display panel 900 under the dispenser 520, so that dispenser 520 can deposit the adhesive 400 on the peripheral area PA of the display panel 900. When the adhesive 400 is a paste, the dispenser 520 may spread the adhesive 400 in the peripheral area PA of the display panel 900. The dispenser 520 may uniformly spread the adhesive 400 in the peripheral area PA as the dispenser 520 moves in the direction of the X and Y axes. Alternatively, when the adhesive 400 is a film, the dispenser 520 may attach the adhesive 400 to the peripheral area PA of the display panel 900.

The UV light source 540 and the bonding tool 550 are positioned adjacent to the dispenser 520. The UV light source 540 and the bonding tool 550 are opposite to each other.

The panel stage 510 aligns the display panel 900 between the UV light source 540 and the bonding tool 550, so that the UV light source 540 is positioned on a rear side of the display panel 900 to irradiate the rear side of the display panel 900 with the UV light along a +Z direction. The UV light source 540 provides the UV light in a wavelength range between about 200 nm and about 500 nm.

The panel stage 510 also aligns the display panel 900 between the UV light source 540 and the bonding tool 550, so that the boding tool 550 is positioned over an upper side of the display panel 900 to press the display panel 900 along a -Z direction. While the UV light source 540 provides the display panel 900 with the UV light to cure the adhesive 400, the boding tool 550 presses the driving part 300 to electrically connect the driving part 300 to the input pad electrode IP in the peripheral area PA of the display panel 900.

In the present example embodiment, the aligner 530 may be positioned adjacent to the UV light source 540 and the bonding tool 550. Alternatively, the aligner 530 may be positioned adjacent to the dispenser 520. When the panel stage 510 aligns the display panel 900 between the UV light source 540 and the bonding tool 550, the aligner 530 puts the driving part 300 in the peripheral area PA. The UV light source 540 irradiates the display panel 900 with UV light and the bonding tool 550 presses the driving part 300 toward the display panel 900, so that the aligner 530 aligns the output pad electrode OP of the driving part 300 to the input pad electrode IP of the display panel 900.

Furthermore, the bonding apparatus 500 may further include a laser light source 560. When the adhesive 400 is partially uncured, the laser light source 560 cures the adhesive 400 with heat, and thus the output pad electrode OP is attached to the input pad electrode IP.

According to the present example embodiment, the bonding apparatus 500 provides the peripheral area PA of the display panel 900 with the UV light, and thus the input pad electrode IP and the output pad electrode OP are electrically and physically attached to each other using the adhesive 400 cured by the UV light.

According to the present disclosure, the adhesive is cured under a first condition in which it is irradiated with UV light or laser light and a second condition in which air is blocked, so a provisional compression is not necessary. Thus, a manufacturing process may be simplified, and a short between precise pad electrodes may be prevented.

The foregoing is illustrative and is not to be construed as limiting thereof. Although a few example embodiments have been described, those skilled in the art will readily appreciate that many modifications are possible in the example embodiments without materially departing from the novel teachings and advantages of the disclosure. Accordingly, all such modifications are intended to be included within the scope of the disclosure. In the claims, means-plus-function clauses are intended to cover the structures described herein as performing the recited function and not only structural equivalents but also equivalent structures. Therefore, it is to be understood that the foregoing is illustrative and is not to be construed as limited to the specific example embodiments disclosed, and that modifications to the disclosed example embodiments, as well as other example embodiments, are intended to be included within the scope of the appended claims and this disclosure.

What is claimed is:

1. A method of manufacturing a display apparatus, the method comprising:

forming a gate line, a data line, a switching element and a pixel electrode in a display area of an upper surface of a display panel, and forming an input pad electrode including a gate pad electrode extended from the gate line and a data pad electrode extended from the data line, and a transparent electrode overlapping the gate pad electrode and the data pad electrode in a peripheral area of the upper surface of the display panel surrounding the display area;

disposing an adhesive comprising a base resin in the peripheral area and a mixture mixed in the base resin, the mixture including a monomer that reacts with at least the base resin, and an ultraviolet (UV) initiator that initiates the reaction of the monomer with the base resin upon irradiation with the UV light;

disposing a driving part comprising an output pad electrode corresponding to the input pad electrode on the display panel on which the adhesive is disposed; and irradiating a rear surface of the display panel opposite the upper surface on which the output pad electrode is disposed with UV light to cure the adhesive.

2. The method of claim 1, wherein an area of the transparent electrode is greater than an area of the output pad electrode in a plan view, and the peripheral area includes a first area in which the input pad electrode and the output pad electrode overlap and a second area in which the input pad electrode and the output pad electrode do not overlap, the adhesive is partially disposed in the first area partially disposed in the second area, wherein the adhesive disposed in the first area is cured by irradiating with UV light.

3. The method of claim 2, wherein the adhesive disposed in the second area is cured by removing air from an area surrounding the adhesive on the second area.

4. The method of claim 1, wherein the mixture further comprises a visible light initiator for initiating the reaction of the monomer as the adhesive is irradiated with visible light.

5. The method of claim 4, further comprising irradiating the upper surface of the display apparatus on which the output pad electrode is disposed with visible light.

6. The method of claim 1, further comprising aligning the output pad electrode to the input pad electrode by pressing the driving part.

* * * * *